United States Patent
Bolling et al.

(10) Patent No.: US 10,986,028 B2
(45) Date of Patent: Apr. 20, 2021

(54) AIRCRAFT MESSAGE ROUTING SYSTEM

(71) Applicant: GE Aviation Systems, LLC, Grand Rapids, MI (US)

(72) Inventors: Randy E. Bolling, Pinellas Park, FL (US); Joseph Bernard Steffler, Grand Rapids, MI (US); Michael Francis Guidoboni, Pinellas Park, FL (US); Venkat Sankar, Bangalore (IN); Eric Rankin Gardner, Tarpon Springs, FL (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 91 days.

(21) Appl. No.: 15/439,170

(22) Filed: Feb. 22, 2017

(65) Prior Publication Data
US 2017/0257320 A1  Sep. 7, 2017

(51) Int. Cl.
*H04L 12/851* (2013.01)
*H04W 48/18* (2009.01)
(Continued)

(52) U.S. Cl.
CPC ..... *H04L 47/2433* (2013.01); *H04B 7/18506* (2013.01); *H04L 47/12* (2013.01); *H04L 67/12* (2013.01); *H04W 48/18* (2013.01)

(58) Field of Classification Search
CPC .......... G08B 13/1965; G08B 13/19673; H04B 7/18504; H04B 7/18506; G01C 23/00;
(Continued)

(56) References Cited

U.S. PATENT DOCUMENTS

| 6,313,759 | B1 | 11/2001 | Musland-Sipper |
| 7,027,402 | B2 | 4/2006 | Hedden |

(Continued)

FOREIGN PATENT DOCUMENTS

WO  2015/060848 A1  4/2015

OTHER PUBLICATIONS

Extended European Search Report and Opinion issued in connection with corresponding EP Application No. 17159102.7 dated Jul. 28, 2017.

(Continued)

*Primary Examiner* — Yemane Mesfin
*Assistant Examiner* — Mon Cheri S Davenport
(74) *Attorney, Agent, or Firm* — Dority & Manning, P.A.

(57) ABSTRACT

Systems and methods for managing aircraft messages are provided. In one embodiment, the method can include receiving a message from an onboard system of an aircraft. The method can include determining a priority associated with the message based, at least in part, on data associated with the message. The data can be indicative of at least a content of the message. The method can include determining data indicative of availability for each of a plurality of communications networks based, at least in part, on one or more first parameters associated with the aircraft. The method can include selecting a network based, at least in part, on message priority, the data indicative of availability, and one or more second parameters associated with each of the networks. The method can include sending the message via the selected network when the network is available, or storing the message when the network is unavailable.

16 Claims, 5 Drawing Sheets

(51) Int. Cl.
*H04B 7/185* (2006.01)
*H04L 12/801* (2013.01)
*H04L 29/08* (2006.01)

(58) Field of Classification Search
CPC .. G01C 23/005; G08G 5/0039; G08G 5/0021; G08G 5/0047; G08G 5/0078; G08G 5/0091; H04L 45/00; H04L 45/124; H04L 45/3065; H04L 67/12; H04L 41/0609; H04L 41/12; H04L 43/10; H04L 47/2433; H04W 4/02; H04W 48/18; G09B 9/20; G09B 9/206; G09B 9/26

See application file for complete search history.

(56) References Cited

U.S. PATENT DOCUMENTS

| | | | |
|---|---|---|---|
| 7,035,634 B2 * | 4/2006 | Mead | G06Q 10/107 455/412.1 |
| 8,121,140 B2 | 2/2012 | McGuffin et al. | |
| 8,284,674 B2 | 10/2012 | True et al. | |
| 8,285,865 B2 | 10/2012 | Gruyer et al. | |
| 8,694,184 B1 * | 4/2014 | Boorman | G01C 23/00 340/945 |
| 2007/0094409 A1 * | 4/2007 | Crockett | H04L 29/06 709/233 |
| 2007/0255850 A1 | 11/2007 | Gould et al. | |
| 2010/0232295 A1 * | 9/2010 | True | H04B 7/18506 370/238 |
| 2014/0380433 A1 * | 12/2014 | Yerger | H04L 63/107 726/4 |
| 2015/0065186 A1 | 3/2015 | Mohd Mohdi et al. | |
| 2015/0156789 A1 | 6/2015 | Beacham, Jr. et al. | |

OTHER PUBLICATIONS

Office Action issued in connection with corresponding EP Application No. 17159102.7 dated Jan. 21, 2019.

European Office Action Corresponding to Application No. 17159102.7 dated Jul. 25, 2019.

* cited by examiner

AIRCRAFT MESSAGE ROUTING SYSTEM

TECHNICAL FIELD

The present subject matter relates generally to managing aircraft messages and more particularly to routing non-ATC messages associated with an aircraft among a plurality of communications networks.

BACKGROUND

Aircrafts typically communicate with an Airline Operation Center through air-to-ground communications. These communications can include air traffic control (ATC) messages and non-ATC messages. Air traffic control messages are typically used to organize the flow of aircraft traffic. For example, an ATC message can request an instrument flight rules (IFR) clearance. Non-ATC messages can include messages other than ATC messages, such as, for example, those reporting a broken overhead compartment.

Air-to-ground communications are transmitted via communications networks between the aircraft and the Airline Operation Center. However, communicating over a more robust network such as a SATCOM network is costly in terms of price per byte. The costs can be mitigated by using an alternative network. However, such networks may not always be available.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a computer-implemented method of managing aircraft messages. The method can include receiving, by one or more computing devices included with an aircraft, a message from an onboard system associated with the aircraft. The method can further include determining, by the one or more computing devices, a priority associated with the message based, at least in part, on data associated with the message. The data associated with the message can be indicative of at least a content of the message. The method can include determining, by the one or more computing devices, data indicative of availability associated with each of a plurality of communications networks based, at least in part, on one or more first parameters associated with the aircraft. The method can further include selecting, by the one or more computing devices, a communications network from the plurality of communications networks based, at least in part, on the priority associated with the message, data indicative of availability associated with the communications network, and one or more second parameters associated with each of the plurality of communications networks. The method can include sending, by the one or more computing devices, the message via the selected communications network when the selected communications network is available.

Another example aspect of the present disclosure is directed to a communications management system for managing aircraft messages. The system can include one or more processors and one or more memory devices included with an aircraft. The one or more memory devices can store instructions that when executed by the one or more processors cause the one or more processors to perform operations. The operations can include receiving one or more messages from one or more onboard systems associated with the aircraft. The operations can further include determining a priority associated with each of the one or more messages based, at least in part, on data associated with each respective message. The data associated with each respective message can be indicative of at least a content of the respective message. The operations can include determining data indicative of availability associated with each of a plurality of communications networks based, at least in part, on one or more first parameters associated with the aircraft. The operations can further include selecting, by the one or more computing devices, a communications network from the plurality of communications networks for each of the one or more messages based, at least in part, on the priority associated with the respective message, the data indicative of availability associated with the communications network, and one or more second parameters associated with each of the communications networks.

Yet another example aspect of the present disclosure is directed to an aircraft. The aircraft can include an engine, a fuselage, and a computing system. The computing system can include one or more processors and one or more memory devices located on the aircraft. The one or more memory devices can store instructions that when executed by the one or more processors cause the one or more processors to perform operations. The operations can include receiving a message from an on-board system associated with an aircraft. The operations can further include determining a priority associated with the message based at least in part on a content of the message. The operations can include determining data indicative of availability associated with each of a plurality of communications networks based at least in part on one or more first parameters associated with the aircraft. The operations can further include selecting a communications network from the plurality of communications networks based at least in part on the priority associated with the message, the data indicative of availability associated with the communications network, and one or more second parameters associated with each of the plurality of communications networks. The operations can include sending the message via the selected communications network when the selected communications network is available. The operations can further include storing the message in a memory device when the selected communications network is not available for sending the message.

Other example aspects of the present disclosure are directed to systems, methods, aircraft, avionics systems, devices, non-transitory computer-readable media for collecting aircraft data.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
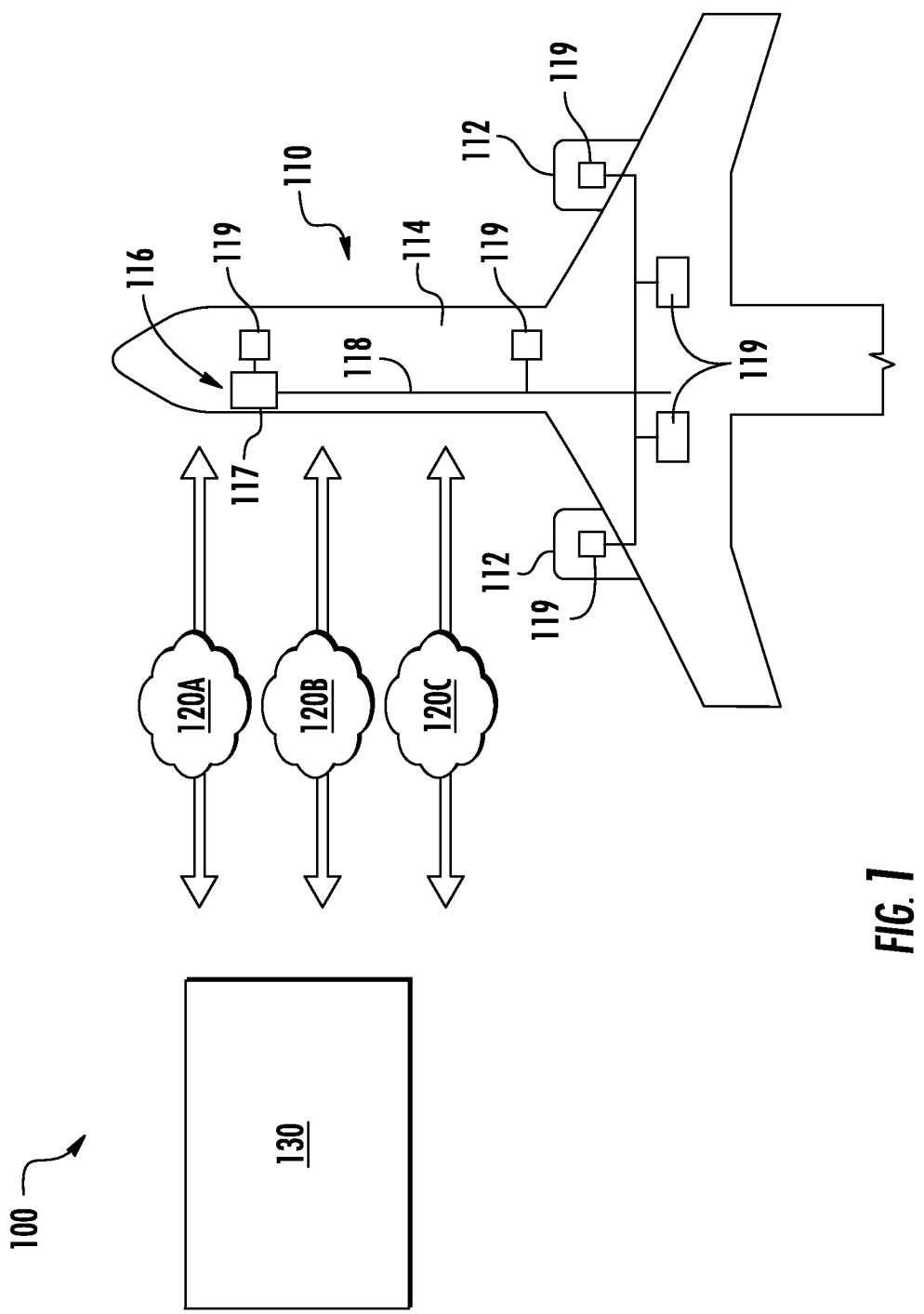
FIG. 1 depicts an example system for managing aircraft messages according to example embodiments of the present disclosure.

Reference now will be made in detail to embodiments of the invention, one or more example(s) of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for managing aircraft messages. For instance, an onboard communications management system can route non-ATC messages amongst a plurality of communications networks to an aircraft operations center. The choice of network can be based on the priority of the message, the availability of the network, and/or one or more parameter(s) associated with the communications networks. For example, the communications management system can receive a beverage re-stock message indicating that the beverage supply of the aircraft needs to be re-stocked. The communications management system can determine that the priority of such a message is low. Based on, for example, the aircraft's location, the communications management system can determine that multiple communications networks are available, such as a SATCOM network, a very high frequency (VHF) network, a Wi-Fi network, etc. The communications management system can also determine that it is costly to send a message via certain networks (e.g., a SATCOM network). Moreover, the communications management system can determine that the bandwidth for sending a message on certain networks is low (e.g., a VHF network), such that a sent message may not arrive. Accordingly, to avoid the high cost of sending a low priority message via a high cost network, the communications management system can select a different network (e.g., a Wi-Fi network) for sending the beverage re-stock message. The beverage re-stock message can be sent to a ground-based aircraft operations center when the different network is available. However, in the event that the different network is unavailable, the beverage re-stock message can be stored so that it can be sent at a later time (e.g., when the selected Wi-Fi network is available).

More particularly, the communications management system can receive a message from an onboard system and/or a flight crew member. In some implementations, the communications management system can receive the message from an onboard system that controls and monitors various components and parameters of the aircraft. For example, an onboard system can detect a change in a parameter (e.g., low fuel flow) associated with a component (e.g., an engine) and automatically send a message regarding the engine fuel flow to the communications management system. In some implementations, a flight crew member can manually input a message to the communications management system.

The communications management system can determine a priority associated with each message. For instance, the communications management system can determine the priority of a message based on its content and/or its timing. By way of example, a mid-flight message indicating a medical emergency can be determined to have a higher priority, while a message during descent indicating the need to re-stock the beverage supply can be determined to have a lower priority.

The communications management system can be configured to communicate with a ground-based aircraft operations center via a plurality of communications networks. Those networks can include, for instance, a SATCOM network, VHF network, a high frequency (HF) network, a Wi-Fi network, a WiMAX network, a gatelink network, or any other suitable communications network for transmitting messages from an aircraft. Each network can be associated with various costs and data delivery reliability. For example, it may be costly to send a message via a highly reliable SATCOM network, while it may be less costly to send a message via a less reliable Wi-Fi network.

The communications management system can determine data indicative of availability associated with each communications network. The availability can be based, at least in part, on one or more first parameter(s) associated with the aircraft (e.g., location, heading, speed, altitude). For example, a Wi-Fi network may be available for sending a message while the aircraft is located over the continental United States, but may be unavailable while the aircraft is located over the Atlantic Ocean, away from a coast.

The communications management system can select a communications network for each message and send the message via the selected network. For instance, the selection can be based, at least in part, on the priority associated with the respective message, the availability associated with the communications network, and/or one or more second parameter(s) associated with each of the communications networks. The second parameter(s) can include, for example, a cost associated with the respective communications network, a traffic level associated with the respective communications network, a size of the data included in the one or more message(s), a time of day, and/or other parameter(s) associated with the communications networks.

By way of example, the communications management system can determine that a beverage re-stock message is lower priority. Moreover, based on the heading, speed, altitude, and/or location of the aircraft (e.g., over the continental U.S.), the communications management system can determine that a SATCOM network, a VHF network, and a Wi-Fi network are available for sending the message. Sending a message on a SATCOM network can be more expensive than sending a message on a VHF network, which can be more expensive than sending a message on a Wi-Fi network. Moreover, the traffic level of the VHF network may be high. Accordingly, the communications management system can select the Wi-Fi network for sending the beverage re-stock message based on the low priority of the message, the availability of the network, the low cost, and/or the traffic level. Although a Wi-Fi network may be less reliable for transmitting the message, such reliability can be tolerable in light of the lower priority of the re-stock message. Accordingly, the communications management system can send the re-stock message via the Wi-Fi network, when the Wi-Fi network is available.

In the event the selected network is unavailable for sending the message, the communications management system can store the message until the selected network is available. For example, if the Wi-Fi network is unavailable for sending the beverage re-stock message, the communications management system can store the re-stock message in a memory device (e.g., including a message queue) until the Wi-Fi network is available.

Additionally, and/or alternatively, the communications management system can be configured to bundle messages, allowing lower priority messages to be sent via more robust, reliable networks. For example, the communications management system can be configured to receive a beverage re-stock message and a medical emergency message and determine whether the messages can be bundled into a bundled message. In some implementations, the priority of the bundled message can be the highest priority associated with a message included in the bundled message. The communications management system can select a communications network for the bundled message (e.g., a SATCOM network for a higher priority bundled message) and send the bundled message via the selected network, if the network is available. Otherwise, the bundled message can be stored in a manner similar to that described above.

The systems and methods according to example aspects of the present disclosure can manage aircraft messages in a cost effective manner. More particularly, the systems and methods can route messages based on message priority, network availability, and parameters of the individual communications networks. As a result, the systems and methods can route messages to reduce unnecessary data traffic on more reliable networks. In this way, the systems and methods according to example aspects of the present disclosure have a technical effect of managing aircraft messages in a more efficient manner by increasing the available bandwidth of more reliable networks for higher priority messages, while decreasing the costs associated with transmitting lower priority messages.

FIG. 1 depicts an example system 100 for managing aircraft messages according to example embodiments of the present disclosure. As shown, the system 100 can include an aircraft 110, a plurality of communications networks 120A-C, and a remote computing system 130. The aircraft 110 and the remote computing system 130 can be configured to communicate between one another via the plurality of communications networks 120A-C, as further described herein. The communications networks 120A-C can include at least one of a SATCOM network, VHF network, a HF network, a Wi-Fi network, a WiMAX network, a gatelink network, and/or any other suitable communications network for transmitting messages from an aircraft.

The aircraft 110 can include one or more engine(s) 112, a fuselage 114, and a communications management system 116. As shown in FIG. 1, the communications management system 116 can include one or more computing device(s) 117 that can be associated with, for instance, an avionics system. The one or more computing device(s) 117 can be included with the aircraft 110. The computing device(s) 117 can be coupled to a variety of systems on the aircraft 110 over a network 118. The network 118 can include a data bus or combination of wired and/or wireless communication links.

The computing device(s) 117 can be in communication with one or more onboard system(s) 119 associated with the aircraft 110. In some implementations, the onboard system(s) 119 can be configured to perform various aircraft operations and control and/or monitor various settings and parameters associated with the aircraft 110. For instance, the onboard system(s) 119 can be associated with communications systems, manual input systems, aircraft control systems, flight management systems, aircraft maintenance systems, data acquisition systems, a flight recorder, monitoring systems, and/or other systems of the aircraft 110.

The computing device(s) 117 can be configured to receive one or more message(s) from the onboard system(s) 119. The messages can include non-air traffic control (ATC) messages. In some implementations, the onboard system(s) 119 can automatically provide a message to the computing device(s) 117. For example, in the event that the engine(s) 112 are experiencing a malfunction, the onboard system(s) 119 associated with the engine(s) 112 can automatically send a message to the computing device(s) 117 regarding the malfunction of the engine(s) 112.

In other implementations, a flight crew member can manually provide a message to the computing device(s) 117. For example, in the event that the beverage supply of aircraft 110 is low in stock, a flight crew member can manually input a beverage re-stock message to the computing device(s) 117 via a manual input system (e.g., including a keyboard, microphone, touchscreen, etc.) indicating the need to re-stock the beverage supply. In another example, in the event that a passenger and/or a flight crew member is experiencing a medical emergency, a flight crew member can manually input a medical emergency message via a manual input system to the computing device(s) 117 regarding the medical emergency.

The computing device(s) 117 can be configured to determine a priority associated with each of the one or more message(s) from the onboard system(s) 119. For instance, the computing device(s) 117 can determine a priority of a message based, at least in part, on data associated with the message. The data can be, for example, indicative of at least the content of the respective message, an aircraft component associated with the message, and/or a time associated with the message.

In some implementations, the computing device(s) 117 can be configured to determine the priority of a message based, at least in part, on one or more keyword(s). For instance, the data associated with a message can include one or more keyword(s). The computing device(s) 117 can be configured search the data to determine the type and/or number of keyword(s) associated with the message. Based, at least in part, on the type and/or number of keyword(s), the computing device(s) 117 can determine a priority associated with the message. In one example, a mid-flight message indicating a medical emergency (e.g., including keywords such as health, medical, care, urgent, immediate, emergency, passenger, flight crew member, etc.) can be determined to have a higher priority. In another example, a message during descent indicating the need to re-stock the beverage supply of the aircraft 110 (e.g., including keywords such as beverage, drink, soda, juice, supply, stock, re-stock, etc.) can be determined to have a lower priority. In other implementations, the computing device(s) 117 can be configured to determine the priority of a message based, at least in part, on a priority table, priority matrix, priority algorithm, priority function, priority equation, etc.

The computing device(s) 117 can be configured to determine data indicative of availability associated with each communications network of the plurality of communications networks 120A-C. The computing device(s) 117 can be configured to determine whether a communications network is available based, at least in part, on one or more first parameter(s) associated with the aircraft. The one or more first parameter(s) can include, for instance, a location of the aircraft 110, a heading of the aircraft 110, a speed of the aircraft 110, an altitude of the aircraft 110, and/or other parameters associated with the aircraft 110. For example, a Wi-Fi network may be unavailable in the event the aircraft 110 is located over an ocean, away from a coast.

The computing device(s) 117 can be configured to select a communications network from the plurality of communications networks 120A-C for each message. For instance, the computing device(s) can be configured to select a communications network based, at least in part, on the priority associated with the respective message, the availability associated with the communications network, and/or one or more second parameter(s) associated with each of the communications networks. The second parameter(s) can include, for example, at least one of a cost associated with the respective communications network, a traffic level associated with the respective communications network, a size of data included in the one or more message(s), and/or other parameters associated with the communications networks 120A-C. The second parameter(s) can also include a time of day. For example, it may be more likely that a VHF network has available bandwidth for sending a message during non-peak times of the day (e.g., outside 9 AM to 7 PM). As further described below with reference to FIGS. 2-3, the one or more first parameter(s) and/or one or more second parameter(s) can be included in a function, table, matrix, etc. stored in one or more memory device(s) of the computing device(s) 117.

The computing device(s) 117 can be configured to store and/or send one or more message(s) based on whether the selected communications network is available. For instance, the computing device(s) 117 can be configured to store a message in a memory device if the communications network 120A-C selected for that message is not available for sending the respective message. However, the computing device(s) 117 can be configured to send a message via the communications network 120A-C selected for the respective message, if the selected communications network 120A-C is available. For instance, the computing device(s) 117 can be configured to send the messages to the remote computing device(s) 130. The remote computing device(s) 130 can be, for instance, associated with a ground-based computing system of an aircraft operations center that is remote from the communications management system 116 of the aircraft 110.

By way of example, the computing device(s) 117 can receive a beverage re-stock message indicating the need to re-stock the beverage supply of the aircraft 110. The computing device(s) 117 can determine that the message is lower priority. Based on, for example, the time of day and the heading, speed, altitude, and/or location of the aircraft 110 (e.g., over the continental U.S.), the computing device(s) 117 can determine that the communications network 120A (e.g., a SATCOM network), the communications network 120B (e.g., a HF network), and the communications network 120C (e.g., a Wi-Fi network) are available for sending the message. Sending a message via a SATCOM network can be more expensive than sending a message via a VHF network, which can be more expensive than sending a message on a Wi-Fi network. In this example, the traffic level of communications network 120B may be high. Accordingly, the computing device(s) 117 can select the communications network 120C (e.g., a Wi-Fi network) for sending the beverage re-stock message based, at least in part, on the lower priority of the message, the availability of the network, the low cost, and/or the traffic level. The computing device(s) 117 can send the beverage re-stock message via the communications network 120C.

In another example, based on the time of day and the heading, speed, altitude, and/or location of the aircraft 110 (e.g., over the Atlantic ocean), the computing device(s) 117 can determine that the communications network 120A (e.g., a SATCOM network) and the communications network 120B (e.g., a VHF network) are available, but that the communications network 120C (e.g., a Wi-Fi network) is unavailable. However, given the lower priority of the beverage re-stock message, the computing device(s) 117 can still select the communications network 120C (e.g., a Wi-Fi network) even though it is not currently available. In such a case, the computing device(s) 117 can store the re-stock message until the communications network 120C is available, as further described herein with reference to FIG. 3.

Additionally, and/or alternatively, the computing device(s) 117 can be configured to bundle one or more message(s). For example, the computing device(s) 117 can be configured to receive a first message and a second message and determine whether the first and second messages can be bundled into a third bundled message. The computing device(s) 117 can be configured to determine a priority of the bundled message based, at least in part, on a priority associated with the first message and/or a priority associated with the second message. The computing device(s) can be configured to select a communications network for the bundled message, as further described herein with reference to FIG. 4.

Figure 2:
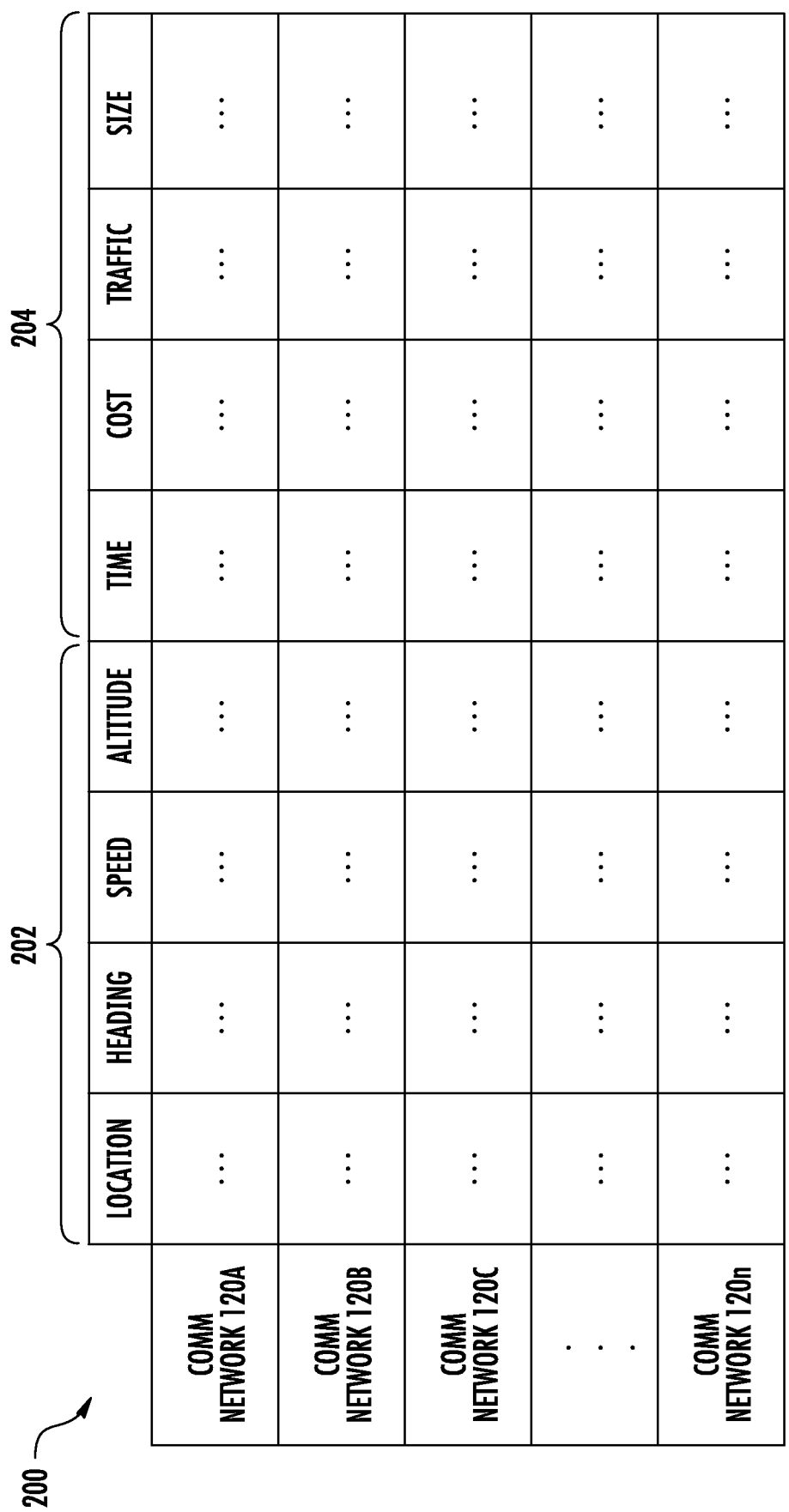
FIG. 2 depicts an example table according to example embodiments of the present disclosure.

FIG. 2 depicts an example table 200 according to example embodiments of the present disclosure. Table 200 can be, for example, a cost table or look-up table. The table 200 can be, for example, provided to and/or stored in one or more memory device(s) of the computing device(s) 117.

As shown in FIG. 2, the table 200 can include the plurality of communications networks 120A-C. The table 200 can also include one or more first parameter(s) 202 associated with the aircraft 110 and/or one or more second parameter(s) 204 associated with the communications networks 120A-C. For example, the one or more first parameter(s) 202 can include a location of the aircraft 110, a heading of the aircraft 110, a speed of the aircraft 110, and/or an altitude of the aircraft 110, and/or any other parameters associated with the aircraft 110. The one or more second parameter(s) 204 can include a time of day, a cost associated with each of the plurality of communications networks 120A-C, a traffic level associated with each of the plurality of communications networks 120A-C, a size of the data associated with the message, and/or any other parameters associated with the communications networks 120A-C. For each parameter, the table 200 can include data associated with the respective communications network 120A-C.

The types and numbers of communications networks, first parameter(s), and/or second parameter(s) depicted in FIG. 2 are for purposes of illustration and discussion. Those of ordinary skill in the art, using the disclosures provided herein, will understand that more or fewer and different types of communications networks, first parameter(s), and/or second parameter(s) can be used without deviations from the scope of the present disclosure.

Figure 3:
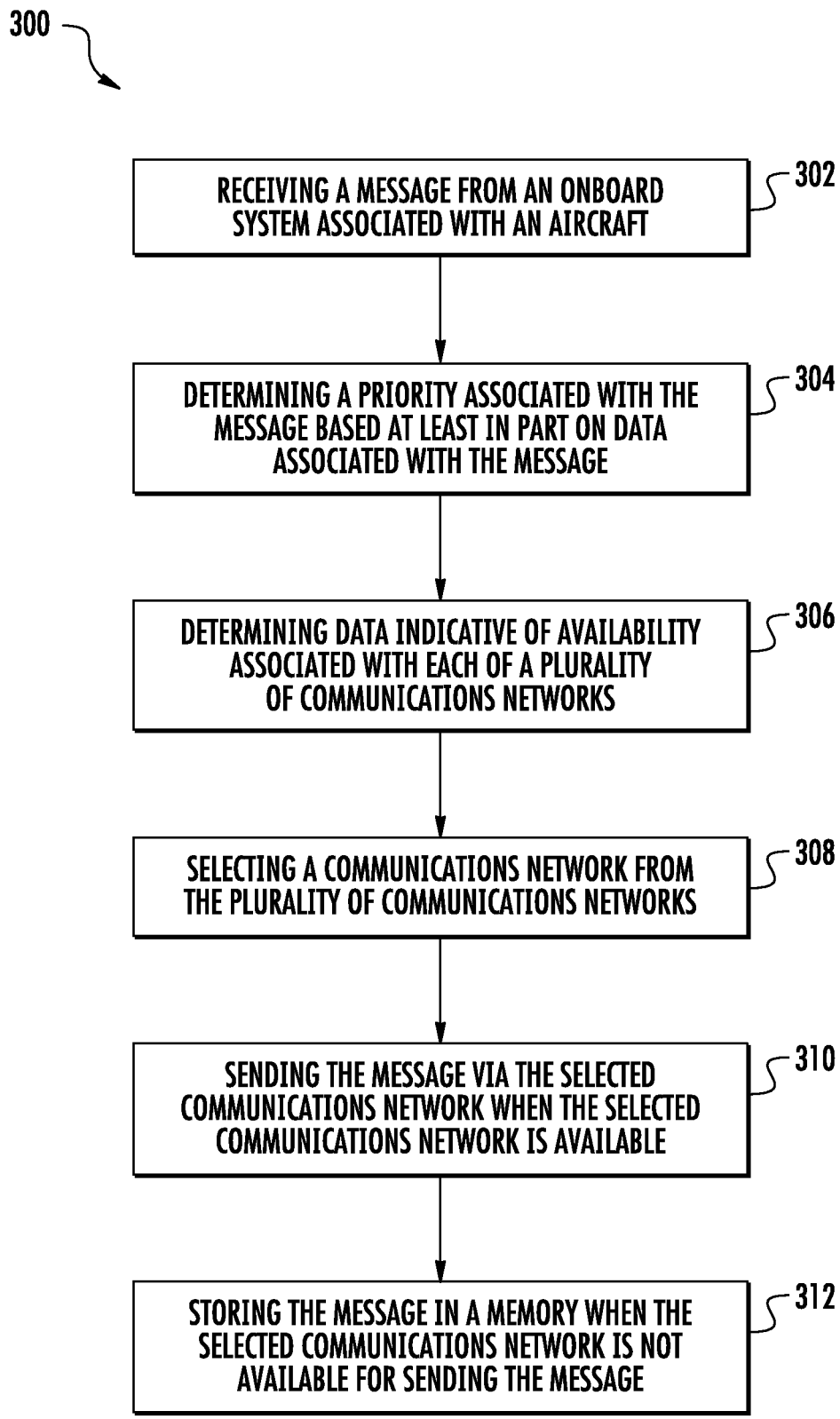
FIG. 3 depicts a flow diagram of an example method for managing aircraft messages according to example embodiments of the present disclosure.

FIG. 3 depicts a flow diagram of an example method 300 of managing aircraft messages according to example embodiments of the present disclosure. FIG. 3 can be implemented by one or more computing device(s), such as the computing device(s) 117 depicted in FIGS. 1 and 5. One or more step(s) of the method 300 can be performed while aircraft 110 is in-flight. In addition, FIG. 3 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (302), the method 300 can include receiving a message from an onboard system associated with the aircraft. For instance, the computing device(s) 117 can receive a message from the onboard system(s) 119 associated with the aircraft 110. The message can be a non-ATC message. For example, the message can be a beverage re-stock message. In another example, the message can be a medical emergency message.

At (304), the method 300 can include determining a priority associated with the message. For instance, the computing device(s) 117 can determine a priority associated with the message based, at least in part, on data associated with the message. The data associated with the message can be indicative of at least one of a content of the message, a time associated with the message, an aircraft component associated with the message, and/or other data associated with message. For example, the computing device(s) 117 can determine that a beverage re-stock message is of lower priority. In another example, the computing device(s) 117 can determine that a medical emergency message is of higher priority.

At (306), the method 300 can include determining data indicative of availability associated with each of a plurality of communications networks. For instance, the computing device(s) 117 can determine data indicative of availability associated with each of the plurality of communications networks 120A-C based, at least in part, on one or more first parameter(s) associated with the aircraft 110. As indicated above, the one or more first parameter(s) can include at least one of a location of the aircraft 110, a heading of the aircraft 110, a speed of the aircraft 110, an altitude of the aircraft 110, and/or other parameters associated with the aircraft 110. For example, based on the location of the aircraft 110, the computing device(s) 117 can determine that a particular SATCOM network (e.g., ACARS network, ARINC network, SITA network, AVICOM network) is available for sending a message. In another example, the computing device(s) 117 can determine that a Wi-Fi network is available for sending a message in the event the aircraft 110 is located over the continental United States. In another example, the computing device(s) 117 can determine that a Wi-Fi network is unavailable for sending a message in the event the aircraft 110 is located over an ocean, away from a coast.

At (308), the method 300 can include selecting a communications network from the plurality of communications networks. For instance, the computing device(s) 117 can select a communications network 120A-C from the plurality of communications networks 120A-C based, at least in part, on the priority associated with the message, the availability associated with the communications network 120A-C, and/or one or more second parameter(s) associated with each of the plurality of communications networks 120A-C. As indicated above, the second parameter(s) can include at least one of a time of day, a cost associated with each of the plurality of communications networks 120A-C, a traffic level associated with each of the plurality of communications networks 120A-C, a size of the data associated with a message, and/or other parameters associated with each of the plurality of communications networks 120A-C.

For example, as indicated above the computing device(s) 117 can determine that a beverage re-stock message is lower priority. Based, at least in part, on the location of the aircraft 110, the computing device(s) 117 can determine that the communications network 120A (e.g., a SATCOM network), the communications network 120B (e.g., a VHF network), and the communications network 120C (e.g., a Wi-Fi network) are available. The computing device(s) can determine, based on the second parameter(s), that the communications network 120A (e.g., a SATCOM network) and/or the communications network 120B (e.g., a VHF network) are experiencing high traffic and that transmitting a message via these networks would be costly. Accordingly, the computing device(s) can select the communications network 120C (e.g., a Wi-Fi network) for the lower priority beverage re-stock message.

Additionally, and/or alternatively, the computing device(s) 117 can select a communications network 120A-C, even if that communications network 120A-C is unavailable. By way of example, based on the time of day and the heading, speed, altitude, and/or location of the aircraft 110 (e.g., over the Atlantic ocean), the computing device(s) 117 can determine that the communications network 120A (e.g., a SATCOM network) and the communications network 120B (e.g., a VHF network) are available, but that the communications network 120C (e.g., a Wi-Fi network) is unavailable. However, given the lower priority of the beverage re-stock message, the computing device(s) 117 can still select the communications network 120C (e.g., a Wi-Fi network) even though it is not currently available.

At (310), the method 300 can include sending the message via the selected communications network when the selected communications network is available. For instance, the computing device(s) 117 can send the message via the selected communications network 120A-C when the selected communications network 120A-C is available. For example, the computing device(s) 117 can send the beverage re-stock message via the selected communications network 120C (e.g., a Wi-Fi network) when the communications network 120C is available.

At (312), the method 300 can include storing the message in a memory device when the selected communications network is not available for sending the message. For instance, the computing device(s) 117 can store the message in a memory device when the selected communications network 120A-C is not available for sending the message. In some implementations, the memory device can include a queue that includes one or more stored message(s) awaiting transmission via its selected communications network. The queue can be organized based, at least in part, on message priority. A message can be placed in the queue based, at least in part, on the priority associated with the message.

For example, in the event that the communications network 120C (e.g., a Wi-Fi network) is unavailable for sending the beverage re-stock message, the computing device(s) 117 can store the message in one or more memory device(s) associated with the computing device(s) 117. When the communications network 120C (e.g., a Wi-Fi network) becomes available, the computing device(s) 117 can send the beverage re-stock message. If the memory device(s) include a queue, the computing device(s) 117 can store the beverage re-stock message in the queue of the memory device(s) based on the associated priority. When the communications network 120C (e.g., a Wi-Fi network) becomes available, the computing device(s) 117 can send the beverage re-stock message according to its order in the queue.

Figure 4:
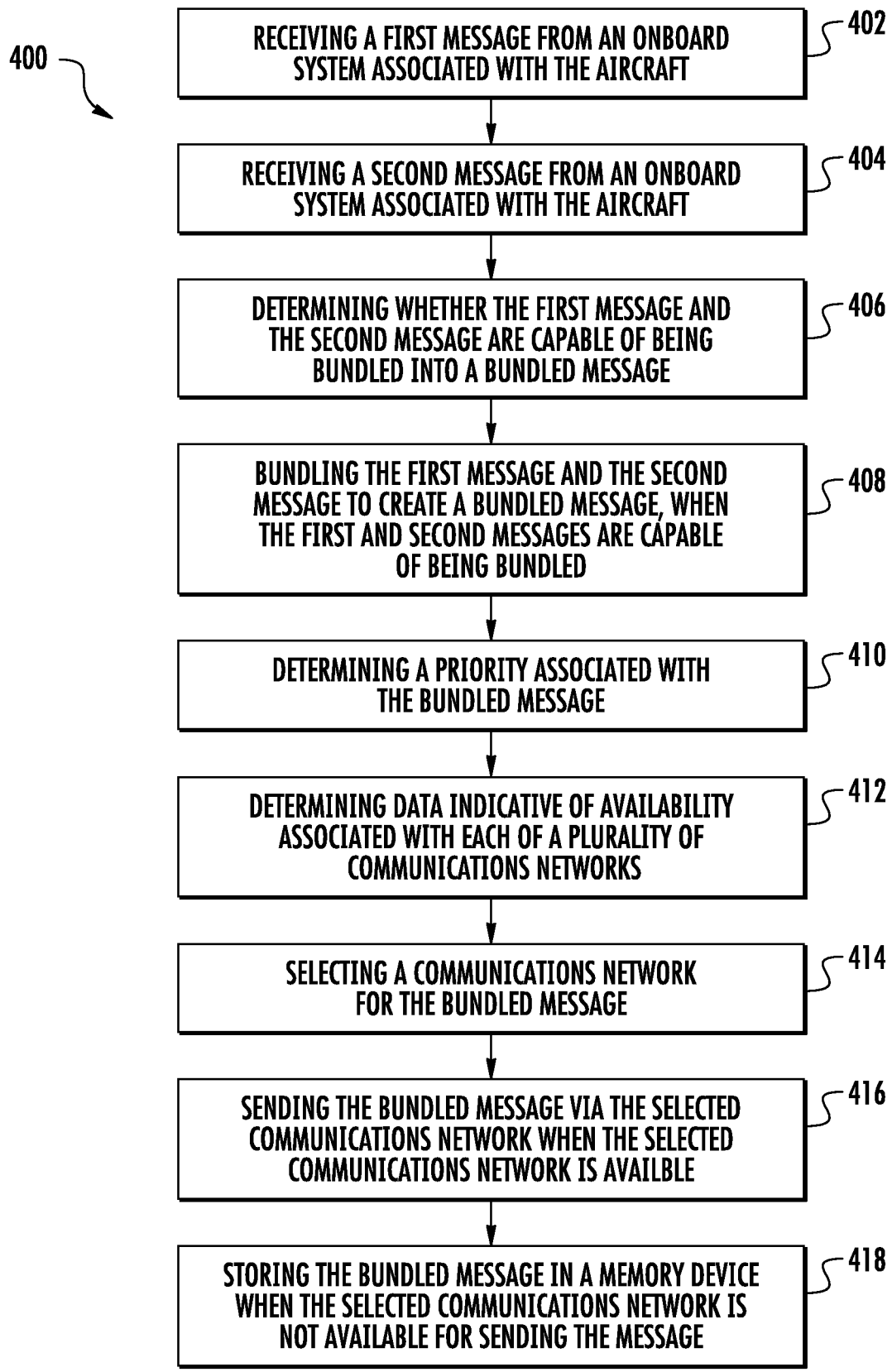
FIG. 4 depicts a flow diagram of example method for managing aircraft messages according to example embodiments of the present disclosure.

FIG. 4 depicts a flow diagram of an example method 400 for managing aircraft messages according to example embodiments of the present disclosure. FIG. 4 can be implemented by one or more computing device(s), such as the computing device(s) 117 depicted in FIGS. 1 and 5. One or more step(s) of the method 400 can be performed while aircraft 110 is in-flight. In addition, FIG. 4 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (402), the method 400 can include receiving a first message from an onboard system associated with the aircraft. For instance, the computing device(s) 117 can receive a first message from the onboard system(s) 119 associated with the aircraft 110. The first message can be a non-ATC message such as, for example, a beverage re-stock message indicating that the beverage supply of the aircraft 110 needs to be re-stocked.

At (404), the method 400 can include receiving a second message from an onboard system associated with the aircraft. For instance, the computing device(s) 117 can receive a second message from the onboard system(s) 119 associated with the aircraft 110. The second message can also be a non-ATC message such as, for example, a medical emergency message indicating that a medical emergency has occurred or is occurring on the aircraft 110.

At (406), the method 400 can include determining whether the first message and the second message are capable of being bundled into a bundled message. For instance, the computing device(s) 117 can determine whether a message can be bundled with the one or more other message(s). In some implementations, the computing device(s) 117 can determine whether the first message can be bundled with the second message based on data associated with the messages. For example, the computing device(s) 117 can determine whether or not the beverage re-stock message can be bundled with the medical emergency message based, at least in part, on a size of the data associated with each message. The data associated with the beverage re-stock message may be small and, thus, capable of being bundled with the medical emergency message.

At (408), the method 400 can include bundling the first message and the second message to create a bundled message, when the first and second messages are capable of being bundled. For instance, the computing device(s) 117 can bundle the first message (e.g., beverage re-stock message) with the second message (e.g., medical emergency message) to create a third bundled message, when the messages are capable of being bundled. The third bundled message can include data associated with the first and second messages.

At (410), the method 400 can include determining a priority associated with the bundled message. For instance, the computing device(s) 117 can determine a priority associated with the third bundled message based, at least in part, on a priority associated with the first message and/or a priority associated with the second message. In some implementations, the priority of the third bundled message can be the highest priority associated with one or more of the message(s) included in the bundled messages. By way of example, a bundled message can include a lower priority beverage re-stock message and a higher priority medical emergency message. The bundled message can be higher priority because of the inclusion of the higher priority medical emergency message. In other implementations, the priority of the bundled message can be an aggregate of the priorities associated with the messages included in the bundled message.

At (412), the method 400 can include determining data indicative of availability associated with each of a plurality of communications networks. For instance, in a manner similar to the method 300, the computing device(s) 117 can determine data indicative of availability associated with each of the plurality of communications networks 120A-C based, at least in part, on one or more first parameter(s) associated with the aircraft 110.

At (414), the method 400 can include selecting a communications network for the bundled message. For instance, computing device(s) 117 can select a communications network 120A-C from the plurality of communications networks 120A-C based, at least in part, on the priority associated with the third bundled message, the availability associated with the communications network 120A-C, and/or one or more second parameter(s) associated with each of the plurality of communications networks 120A-C. For example, the computing device(s) 117 can determine that the third bundled message is of higher priority (e.g., due to the inclusion of the medical emergency message). Based, at least in part, on the location of the aircraft 110, the computing device(s) can determine that the communications network 120A (e.g., a SATCOM network), the communications network 120B (e.g., a VHF network), and the communications network 120C (e.g., a Wi-Fi network) are available. Given the higher priority of the third bundled message, the computing device(s) 117 can select the communications network 120A (e.g., a SATCOM network) despite its higher cost. In another example, the computing device(s) 117 can select the communications network 120B (e.g., a VHF network) if, for instance, the communications network 120A (e.g., a SATCOM network) is experiencing a high traffic level.

At (416), the method 400 can include sending the bundled message via the selected communications network when the selected communications network is available. For instance, the computing device(s) 117 can send the third bundled message via the selected communications network 120A-C when the selected communications network 120A-C is available.

At (418), the method 400 can include storing the bundled message in a memory when the selected communications network is not available for sending the message. For instance, the computing device(s) 117 can store the third bundled message in a memory device when the selected communications network 120A-C is not available for sending the message. In some implementations, the third bundled message can be placed in the queue of the memory device based, at least in part, on the priority associated with the bundled message.

Figure 5:
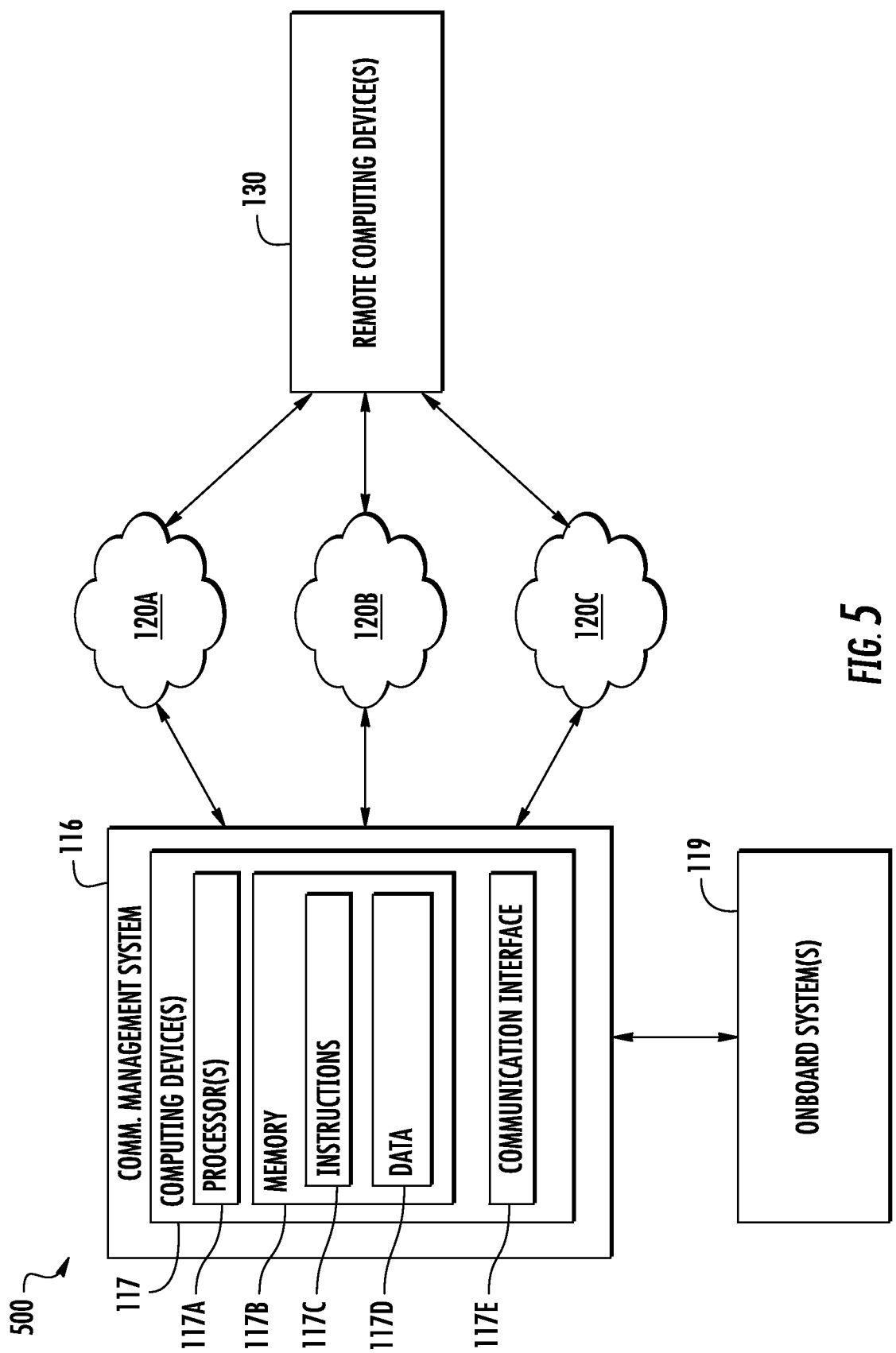
FIG. 5 depicts an example system according to example embodiments of the present disclosure.

FIG. 5 depicts an example system 500 according to example embodiments of the present disclosure. The system 500 can include the communications management system 116 and the remote computing device(s) 130. The remote computing device(s) 130 can be located at a remote location that is separated and remote from the communications management system 116 located onboard the aircraft 110. For instance, the remote computing device(s) 130 can be associated with a ground-based system of an aircraft operations center. The onboard computing system 110 and the remote computing device(s) can be configured to communicate via the plurality of communications networks 120A-

C, such as, a SATCOM network, VHF network, a high frequency (HF) network, a Wi-Fi network, a WiMAX network, a gatelink network, or any other suitable communications network for transmitting messages from an aircraft.

As shown, the communications management system 116 can include one or more computing device(s) 117. The computing device(s) 117 can include one or more processor (s) 117A and one or more memory device(s) 117B. The one or more processor(s) 117A can include any suitable processing device, such as a microprocessor, microcontroller, integrated circuit, logic device, or other suitable processing device. The one or more memory device(s) 117B can include one or more computer-readable media, including, but not limited to, non-transitory computer-readable media, RAM, ROM, hard drives, flash drives, or other memory devices.

The one or more memory device(s) 117B can store information accessible by the one or more processor(s) 117A, including computer-readable instructions 117C that can be executed by the one or more processor(s) 117A. The instructions 117C can be any set of instructions that when executed by the one or more processor(s) 117A, cause the one or more processor(s) 117A to perform operations. The instructions 117C can be software written in any suitable programming language or can be implemented in hardware. In some embodiments, the instructions 117C can be executed by the one or more processor(s) 117A to cause the one or more processor(s) 117A to perform operations, such as the operations for managing aircraft messages and/or operations for bundling messages, as described with reference to FIGS. 3 and 4, and/or any other operations or functions of the one or more computing device(s) 117.

The memory device(s) 117B can further store data 117D that can be accessed by the processors 117A. For example, the data 117D can include data associated with one or more message(s), parameter(s) associated with the aircraft 110, and/or parameters associated with the communications networks 120A-C. The data 117D can include one or more table(s), function(s), algorithm(s), model(s), equation(s), etc. For instance, in one example implementation, the data 117D can include the table 200.

The memory device(s) 117B can include a queue 117E that can be accessed by the processors 117A. For example, the memory device(s) 117B can store one or more message (s) (and/or the data associated therewith) in queue 117E when the communications network 120A-C associated with the message(s) is not available. As shown in FIG. 5, the queue 117E can be organized based, at least in part, on message priority. A message can be placed in the queue 117E based, at least in part, on the priority associated with the message. The processor(s) 117A can send the one or more message(s) to the remote computing device(s) 130 based on the order of the queue 117A, when the communications network 120A-C associated with the message(s) becomes available.

The computing device(s) 117 can also include a network interface 117F used to communicate, for example, with the other components of system 500. The network interface 117F can include any suitable components for interfacing with one more network(s), including for example, transmitters, receivers, ports, controllers, antennas, or other suitable components.

The technology discussed herein makes computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of managing aircraft messages, comprising:

receiving, by one or more computing devices included in an aircraft, a message from an onboard system associated with the aircraft;

determining, by the one or more computing devices, a priority associated with the message based at least in part on data associated with the message, wherein the data associated with the message is indicative of at least a content of the message;

determining, by the one or more computing devices, data indicative of availability associated with each of a plurality of communications networks based at least in part on one or more first parameters associated with the aircraft;

selecting, by the one or more computing devices, a communications network from the plurality of communications networks based at least in part on the priority associated with the message, the data indicative of availability associated with the communications network, and one or more second parameters associated with each of the plurality of communications networks;

sending, by the one or more computing devices, the message via the selected communications network when the selected communications network is available;

storing, by the one or more computing devices, the message from the onboard system associated with the aircraft in a memory device when the selected communications network is not available for sending the message until the communications network selected based at least in part on the priority associated with the message is available; and determining, by the one or more computing devices, whether the message is capable of being bundled with one or more other messages, and wherein when the message is capable of being bundled with one or more of the other messages, the method further comprises bundling, by the one or more computing devices, the message with the one or more other messages to create a bundled aircraft message, wherein a bundled message priority associated with the bundled aircraft message is equal to a highest priority of one of the messages included in the bundled aircraft message.

2. The computer-implemented method as claimed in claim 1, wherein the one or more first parameters comprise at least one of a location of the aircraft, a heading of the aircraft, a speed of the aircraft, or an altitude of the aircraft.

3. The computer-implemented method as claimed in claim 1, wherein the one or more second parameters comprise at least one of a time of day, cost associated with each of the plurality of communications networks, a traffic level associated with each of the plurality of communications networks, or a size of the data associated with the message.

4. The computer-implemented method as claimed in claim 1, wherein the message is a non-air traffic control message.

5. The computer-implemented method as claimed in claim 1, wherein the one or more first parameters and the one or more second parameters are included in a table stored in one or more memory devices of the one or more computing devices.

6. The computer-implemented method as claimed in claim 1, wherein the memory device includes a queue that is organized based at least in part on message priority, and wherein the message is placed in the queue based at least in part on the priority associated with the message.

7. The computer-implemented method as claimed in claim 1, wherein selecting, by the one or more computing devices, the communications network from the plurality of communications networks comprises selecting a communications network for the bundled message based at least in part on a priority associated the bundled message.

8. The computer-implemented method as claimed in claim 1, wherein the plurality of communications networks comprise at least one of a SATCOM network, a VHF network, a HF network, a Wi-Fi network, a WiMAX network, or a gatelink network.

9. A communications management system for managing aircraft messages, the system comprising one or more processors and one or more memory devices included with an aircraft, the one or more memory devices storing instructions that when executed by the one or more processors cause the one or more processors to perform operations, the operations comprising:
receiving one or more messages from one or more onboard systems associated with the aircraft;
determining a priority associated with each of the one or more messages based at least in part on data associated with each respective message, wherein the data associated with each respective message is indicative of at least a content of the respective message;
determining data indicative of availability associated with each of a plurality of communications networks based at least in part on one or more first parameters associated with the aircraft;
selecting a communications network from the plurality of communications networks for each of the one or more messages based at least in part on the priority associated with the respective message, the data indicative of availability associated with the communications network, and one or more second parameters associated with each of the communications networks;
sending one or more of the messages via the communications network selected for the respective message, if the selected communications network is available; and
storing one or more of the messages from the one or more onboard systems associated with the aircraft in a memory device if the communications network selected for the respective message is not available for sending the respective message until the communications network selected based at least in part on the priority associated with the respective message is available,
wherein the one or more messages comprise a first message and a second message and wherein the operations further comprise determining whether the first message and the second message are capable of being bundled into a third message, wherein a bundled aircraft message priority associated with the third message is equal to a highest priority of one of the messages included in the third message.

10. The communications management system as claimed in claim 9, wherein the one or more first parameters comprise at least one of a location of the aircraft, a heading of the aircraft, a speed of the aircraft, or an altitude of the aircraft, and
wherein the one or more second parameters comprise at least one of a time of day, a cost associated with the respective communications network, a traffic level associated with the respective communications network, or a size of data included in the one or more messages.

11. The communications management system as claimed in claim 9, wherein the one or more messages are non-air traffic control messages.

12. The communications management system as claimed in claim 9, wherein when the first message and the second message are capable of being bundled into the third message,
wherein determining the priority associated with each of the one or more messages comprises determining a priority associated with the third message based at least in part on a priority associated with the first message and a priority associated with the second message, and
wherein selecting the communications network from the plurality of communications networks comprises selecting a communications network for the third message.

13. An aircraft, comprising:
an engine;
a fuselage; and
a computing system comprising one or more processors and one or more memory devices located on the aircraft, the one or more memory devices storing instructions that when executed by the one or more processors cause the one or more processors to perform operations comprising:
receiving a message from an on-board system associated with an aircraft;
determining a priority associated with the message based at least in part on a content of the message;
determining data indicative of availability associated with each of a plurality of communications networks based at least in part on one or more first parameters associated with the aircraft;
selecting a communications network from the plurality of communications networks based at least in part on the priority associated with the message, the data indicative of availability associated with the communications network, and one or more second parameters associated with each of the plurality of communications networks;
sending the message via the selected communications network when the selected communications network is available; and storing the message from the on-board system associated with the aircraft in a memory device when the selected communications network is not available for sending the message until the communications network selected based at least in part on the priority associated with the message is available, wherein the operations further comprise determining whether the message is capable of being bundled with one or more other messages, and wherein selecting the communications network comprises selecting the communications network based at least in part on whether the message is capable of being bundled with one or more other messages, wherein a bundled message priority associated with a bundled aircraft message is equal to a highest priority of one of the messages included in the bundled aircraft message.

14. The aircraft as claimed in claim 13, wherein the one or more first parameters comprise at least one of a location of the aircraft, a heading of the aircraft, a speed of the aircraft, or an altitude of the aircraft, and wherein the one or more second parameters comprise at least one of a time of day, a cost associated with each of the plurality of communications networks, a traffic level associated with each of the plurality of communications networks, or a size of the data associated with the message.

15. The computer-implemented method as claimed in claim 1, wherein the bundled message priority is an aggregate of the priorities associated with the messages included in the bundled aircraft message.

16. The computer-implemented method as claimed in claim 1, further comprising:
  selecting, by the one or more computing devices, the communications network from the plurality of communications networks based at least in part on the bundled message priority; and
  sending, by the one or more computing devices, the bundled aircraft message via a SATCOM network when the bundled message priority is a higher priority.

* * * * *